(12) United States Patent
Huang et al.

(10) Patent No.: US 10,747,326 B2
(45) Date of Patent: Aug. 18, 2020

(54) MOTION DETECTION SYSTEM

(71) Applicant: PIXART IMAGING INC., Hsin-Chu County (TW)

(72) Inventors: Sen-Huang Huang, Hsin-Chu County (TW); Ming-Tsan Kao, Hsin-Chu County (TW); En-Feng Hsu, Hsin-Chu County (TW); Yu-Hao Huang, Hsin-Chu County (TW); Nien-Tse Chen, Hsin-Chu County (TW)

(73) Assignee: PIXART IMAGING INC., Hsin-Chu County (TW)

( * ) Notice: Subject to any disclaimer, the term of this patent is extended or adjusted under 35 U.S.C. 154(b) by 230 days.

(21) Appl. No.: 14/097,442

(22) Filed: Dec. 5, 2013

(65) Prior Publication Data

US 2014/0168065 A1    Jun. 19, 2014

(30) Foreign Application Priority Data

Dec. 14, 2012   (TW) .................................. 101147554
Nov. 7, 2013    (TW) .................................. 102140448

(51) Int. Cl.
  *G06F 3/01*     (2006.01)
  *G06K 9/00*     (2006.01)
  *H04N 5/247*    (2006.01)
  *G06F 3/0346*   (2013.01)

(52) U.S. Cl.
  CPC ......... *G06F 3/017* (2013.01); *G06K 9/00355* (2013.01); *H04N 5/247* (2013.01)

(58) Field of Classification Search
  CPC ...... G06F 3/0421; G06F 3/0304; G06F 3/017; G06K 9/00355

USPC .................................................. 345/156–169
See application file for complete search history.

(56) References Cited

U.S. PATENT DOCUMENTS

| | | | |
|---|---|---|---|
| 7,850,526 B2 * | 12/2010 | Zalewski ................ | G06F 3/017 463/36 |
| 8,743,052 B1 | 6/2014 | Keller et al. | |
| 2002/0186221 A1 * | 12/2002 | Bell ........................ | G06F 3/011 345/474 |
| 2006/0187196 A1 | 8/2006 | Underkoffler et al. | |
| 2010/0134308 A1 * | 6/2010 | Barnardo et al. ............. | 340/670 |
| 2010/0315335 A1 * | 12/2010 | Villar ...................... | G06F 3/016 345/158 |
| 2010/0315336 A1 | 12/2010 | Butler et al. | |
| 2011/0267264 A1 * | 11/2011 | McCarthy et al. ........... | 345/157 |

(Continued)

FOREIGN PATENT DOCUMENTS

TW        M293184 U      7/2006

OTHER PUBLICATIONS

Ren, Li; Gesture Detection Based on Information from Multiple Types of Sensors; Mar. 1, 2012; U.S. Appl. No. 61/605,636.*

(Continued)

*Primary Examiner* — Kwin Xie
(74) *Attorney, Agent, or Firm* — Hauptman Ham, LLP

(57) ABSTRACT

The present invention provides a motion detecting system, which includes a light source module, a plurality of image sensors and a control unit. The light source module illuminates at least one object. The image sensors respectively detect the object under the light emitted by the light source module to generate a plurality of detection results. The control unit is coupled to the image sensors, and generates a control command according to the detection results.

12 Claims, 17 Drawing Sheets

(56) References Cited

U.S. PATENT DOCUMENTS

| | | |
|---|---|---|
| 2011/0298708 A1 | 12/2011 | Hsu |
| 2012/0069168 A1 | 3/2012 | Huang et al. |
| 2012/0119985 A1* | 5/2012 | Kang ................. G06F 3/017 345/156 |
| 2012/0280900 A1* | 11/2012 | Wang et al. ................. 345/156 |
| 2013/0043928 A1* | 2/2013 | Jung et al. ................. 327/514 |
| 2013/0050432 A1* | 2/2013 | Perez ................. H04N 13/0278 348/47 |
| 2013/0229508 A1* | 9/2013 | Li et al. ................. 348/77 |
| 2013/0328763 A1* | 12/2013 | Latta ................. G06F 3/017 345/156 |
| 2014/0145929 A1 | 5/2014 | Minnen |
| 2014/0240231 A1 | 8/2014 | Minnen |
| 2014/0306877 A1 | 10/2014 | Katz et al. |

OTHER PUBLICATIONS

Ren, Li; Gesture Detection Based on Information from Multiple Types of Sensors; Aug. 22, 2012; U.S. Appl. No. 61/691,989.*

* cited by examiner

MOTION DETECTION SYSTEM

CROSS REFERENCE TO RELATED APPLICATION

The present application is based on and claims priority to Taiwanese Application Number 101147554, filed Dec. 14, 2012 and Taiwanese Application Number 102140448, filed Nov. 7, 2013, the disclosure of which is hereby incorporated by reference herein in its entirety.

BACKGROUND

1. Field of the Disclosure

The present invention relates to motion detection, and more particularly, to a motion detecting system having a plurality of image sensors.

2. Description of the Related Art

Today, motion detection technology is widely applied to field of human-machine interface, where a new one is gesture sensing technique. The gesture sensing system can determine a user's requirement or instruction by sensing the user's hand motion or state, and then generates electrical signals to control the system.

Generally, a conventional gesture sensing system includes a light source and an image sensor. The light source generates light to the user's hand, and the image sensor captures/senses reflected light of the hand. However, because the lens of the image sensor has a limited view angle, the image sensor cannot capture the hand motion or state outside a specific range, causing the gesture sensing system having a limited sensing range.

SUMMARY

To solve the problem that the gesture sensing system has a limited sensing range, the present invention provides a motion detecting system having a plurality of image sensors, which can increase the effective sensing range of the motion detecting system. In addition, the present invention also provides positioning methods of the image sensors and light source module. By using these positioning methods, the motion detecting system can detect the motion and state of the object more accurately.

According to one embodiment of the present invention, a motion detecting system includes a light source module, a plurality of image sensors and a control unit. The light source module illuminates at least one object. The image sensors respectively detect the object under the light emitted by the light source module to generate a plurality of detection results. The control unit is coupled to the image sensors, and generates a control command according to the detection results.

According to another embodiment of the present invention, a motion detecting system includes a light source module, a plurality of image sensors, a control unit and a wireless transmitting module. The light source module illuminates at least one object. The image sensors respectively detect the object under the light emitted by the light source module to generate a plurality of detection results. The control unit is coupled to the image sensors, and generates a control command according to the detection results. The wireless transmitting module is coupled to the control unit, and transmits the control command to a host.

These and other objectives of the present invention will no doubt become obvious to those of ordinary skill in the art after reading the following detailed description of the preferred embodiment that is illustrated in the various figures and drawings

BRIEF DESCRIPTION OF THE DRAWINGS

Other objects, advantages, and novel features of the present disclosure will become more apparent from the following detailed description when taken in conjunction with the accompanying drawings.

DETAILED DESCRIPTION OF THE EMBODIMENT

Figure 1:
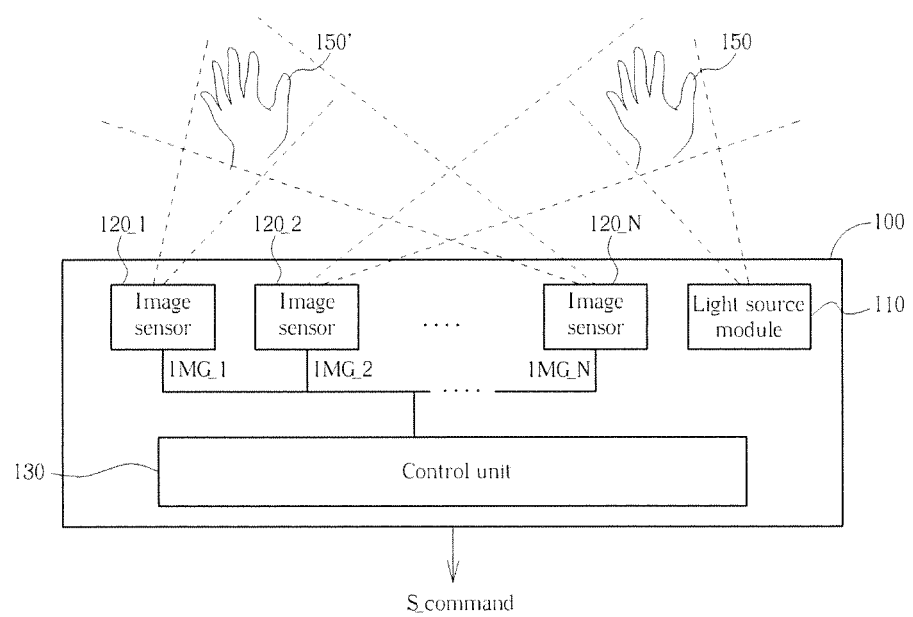
FIG. 1 is a diagram illustrating a motion detecting system according to a first embodiment of the present invention.

FIG. 1 is a diagram illustrating a motion detecting system according to an embodiment of the present invention. As shown in FIG. 1, the motion detecting system 100 includes a light source module 110, a plurality of image sensors 120_1-120_N and a control unit 130. The light source module 110 is used to generate light to an object 150. In this embodiment, the object 150 can be a user's hand, but it's not a limitation of the present invention. In other embodiments, the object 150 can be any other object that can represent different motions and states. The image sensors 120_1-

120_N sense the object 150 under the light (i.e. the reflecting light of the object 150) to generate a plurality of different image sensing results IMG_1-IMG_N. The control unit 130 is couple to the image sensors 120_1-120_N, and is used to generate a control command S_command according to the image sensing results IMG_1-IMG_N. Finally, the motion detecting system 100 transmits the control command S_command to a host.

In one embodiment, some control commands may be determined by sensing the motions or states of more than one object (i.e. user's left hand and right hand). In this condition, the motion detecting system 100 needs to perform motion detection upon the objects. At this time, the light source module 110 illuminates the object 150 and the object 150', and the image sensors 120_1 and 120_2 sense the object 150 and the object 150', respectively, to generate two different image sensing results IMG_1 and IMG_2. Then, the control unit 130 generates the control command S_command according to the image sensing results IMG_1 and IMG_2.

Figure 2:
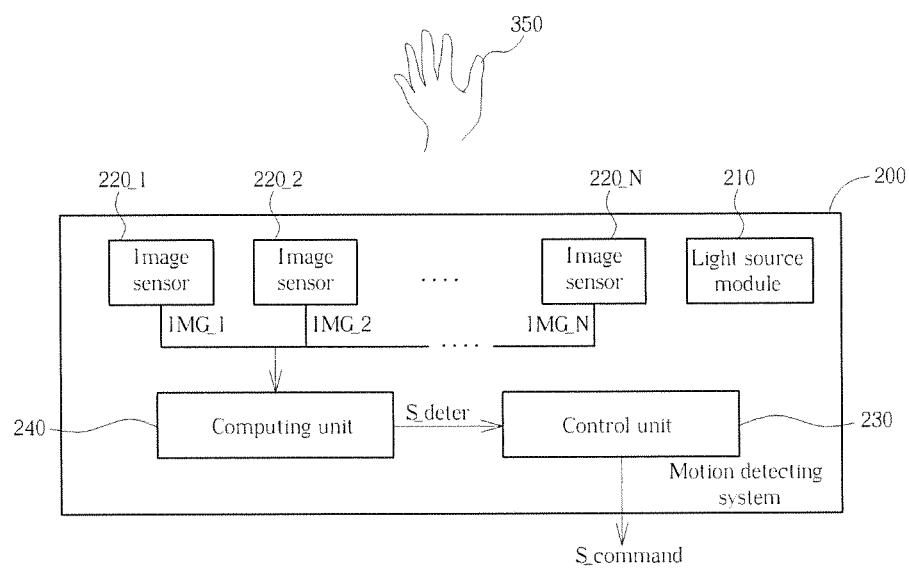
FIG. 2 is a diagram illustrating a motion detecting system according to a second embodiment of the present invention.

In addition, before the control unit generates the control command S_command according to the image sensing results IMG_1-IMG_N, the motion detecting system can use its computing unit to analyze the image sensing results IMG_1-IMG_N. Please refer to FIG. 2, which is a diagram illustrating a motion detecting system according to another embodiment of the present invention. As shown in FIG. 2, the motion detecting system 200 comprises not only a light source module 210, a plurality of image sensors 220_1-220_N and a control unit 230 but also a computing unit 240. The computing unit 240 is coupled between the image sensors 220_1-220_N and the control unit 230, and the computing unit 240 is used to generate a determining result S_deter according to the image sensing results IMG_1-IMG_N, where the determining result S_deter indicates the motion and state of the object 250. Then the computing unit 240 transmits the determining result S_deter to the control unit 230, and the control unit 230 generates the control command S_command according to the determining result S_deter. In addition, operations of the computing unit 240 may include analyzing image contents of the image sensing results IMG_1-IMG_N, and determines a shape and/or a center of the object 250, and/or determines a relative distance, angle and moving direction between the object 250 and the image sensors. For example, when the object 250 is a use's hand, the computing unit 240 can determine what gesture the hand shows. Then the control unit 230 compares the determining result S_deter with predetermined gesture(s), and the control unit 230 generates the control command S_command when the gesture the hand shows now is the same as a predetermined gesture.

Figure 3:
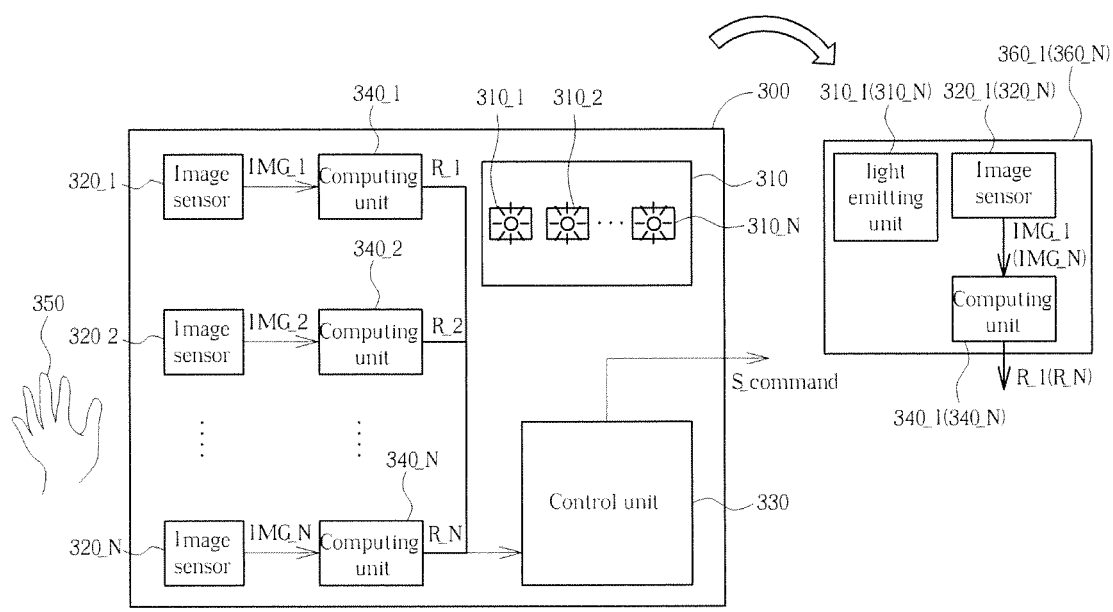
FIG. 3 is a diagram illustrating a motion detecting system according to a third embodiment of the present invention.

In another embodiment, the motion detecting system may include a plurality of computing units, and the computing units analyze image contents of the image sensing results, respectively. Please refer to FIG. 3, the motion detecting system 300 comprises a plurality of computing units 340_1-340_N, where the computing units 340_1-340_N are coupled to the image sensors 320_1-320_N, and the computing units 340_1-340_N respectively receive the image sensing results IMG_1-IMG_N generated from the image sensors 320_1-320_N. Each of the computing units 340_1-340_N may generate a determining result by determining a shape and/or a center of the object 350, and/or by determining a relative distance, angle and moving direction between the object 350 and the image sensors. The control unit 330 receives the determining results R_1-R_N from the computing units 340_1-340_N to generate the control command S_command. In addition, the light source module 310 includes a plurality of light emitting units 310_1-310_N. Practically, the motion detecting system 300 can be regarded as a combination of a plurality of motion detecting sub-systems 360_1-360_N, where each of the motion detecting sub-systems comprises a light emitting unit, an image sensor and a computing unit. Because each of the motion detecting sub-systems is similar to the conventional gesture sensor, therefore, the motion detecting system 300 can be implemented by using the conventional gesture sensors and using the control unit 330 to integrate and analyze the determining results of the computer units of the gesture sensors to obtain the control command S_command.

Figure 4:
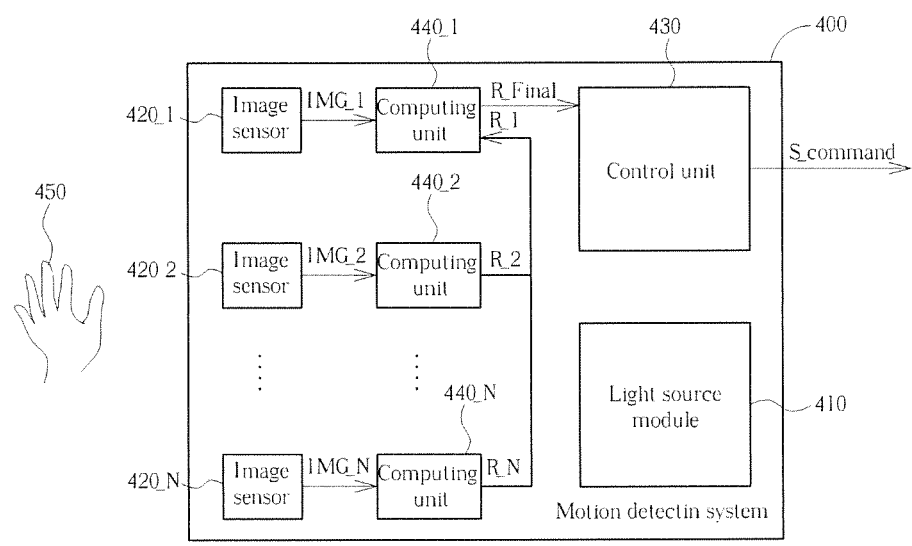
FIG. 4 is a diagram illustrating a motion detecting system according to a fourth embodiment of the present invention.

In another embodiment, the motion detecting system may include a plurality of computing units, but one of the computing units is used as a master. That is, the determining results generated from the other computing units are transmitted to the master first, and after the master analyzes the relationship between the data, the computing unit serving as the master transmits an integrated determining result to the control unit. The detail of the above-mentioned embodiment is shown in FIG. 4. The motion detecting system 400 comprises a plurality of computing units 440_1-440_N, where the computing units 440_1-440_N are coupled to the image sensors 420_1-420_N, and the computing units 440_1-440_N respectively receive the image sensing results IMG_1-IMG_N generated from the image sensors 420_1-420_N. Each of the computing units 440_1-440_N may generate a determining result by determining a shape and/or a center of the object 450, and/or by determining a relative distance, angle and moving direction between the object 350 and the image sensors. In addition, the computing unit 440_1 serving as the master receives the determining results R_2-R_N from the computing units 440_2-440_N, and the computing unit 440_1 generates an integrated determining result R_Final according to the determining results R_1-R_N, and transmits the integrated determining result R_Final to the control unit 430 to make the control unit 430 generate a corresponding control command S_command.

In addition, in the above embodiment, the light source module may comprise a plurality of light emitting units, and the control unit can control these light emitting units to illuminate the object at different times, respectively, and the image sensors sense the object at different times, respectively, to generate the image sensing results IMG_1-IMG_N.

Because the image sensor has a limited sensing range, to satisfy the demands of various applications, the image sensors of the motion detecting system of the preset invention have several possible positioning methods described as follows.

Figure 5A:
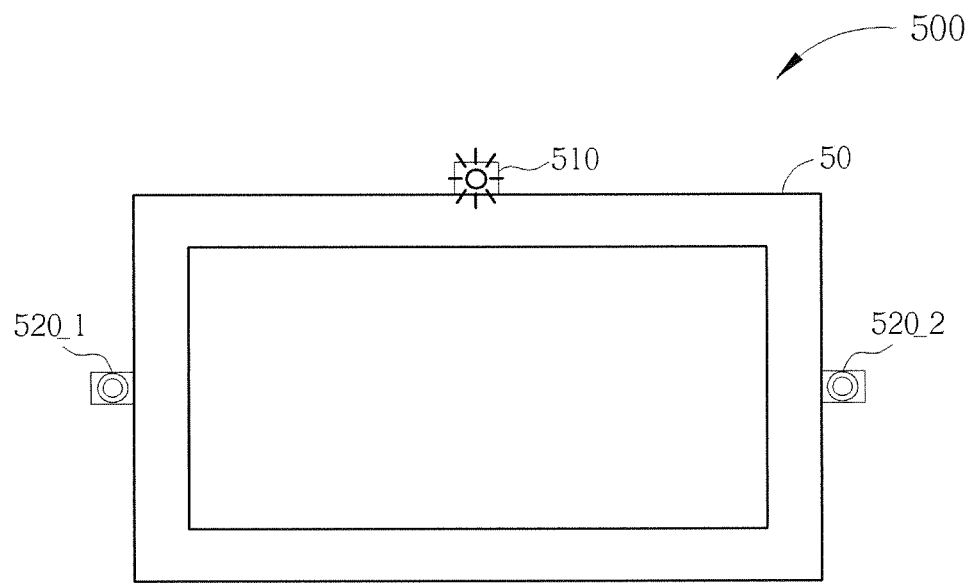
FIG. 5A-5B are diagrams showing one position of the motion detecting systems according to embodiments of the present invention.
Figure 5B:
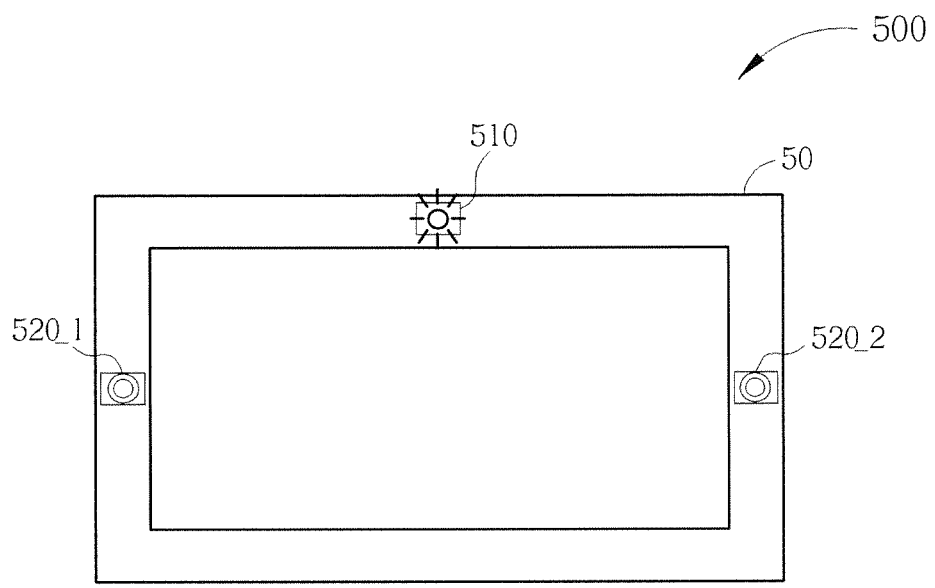

FIG. 5A and FIG. 5B are diagrams showing the positions of the motion detecting systems according to another embodiment of the present invention. As shown in FIG. 5A and FIG. 5B, the motion detecting system 500 comprises a light source module 510, image sensors 520_1-520_2 and a control unit (not shown). The image sensor 520_1 is positioned on a left side of a display device 50, and the image sensor 520_2 is positioned on a right left side of the display device 50, therefore, the horizontal sensing range of the motion detecting system 500 can be effectively increased. The difference between the embodiments shown in FIG. 5A and FIG. 5B is that: the light source module 510 and the image sensors 520_1-520_2 shown in FIG. 5B are positioned inside a housing of the display device 50, and the light source module 510 and the image sensors 520_1-520_2 shown in FIG. 5A are positioned outside the display device 50 (may be connected together or not).

Figure 6A:
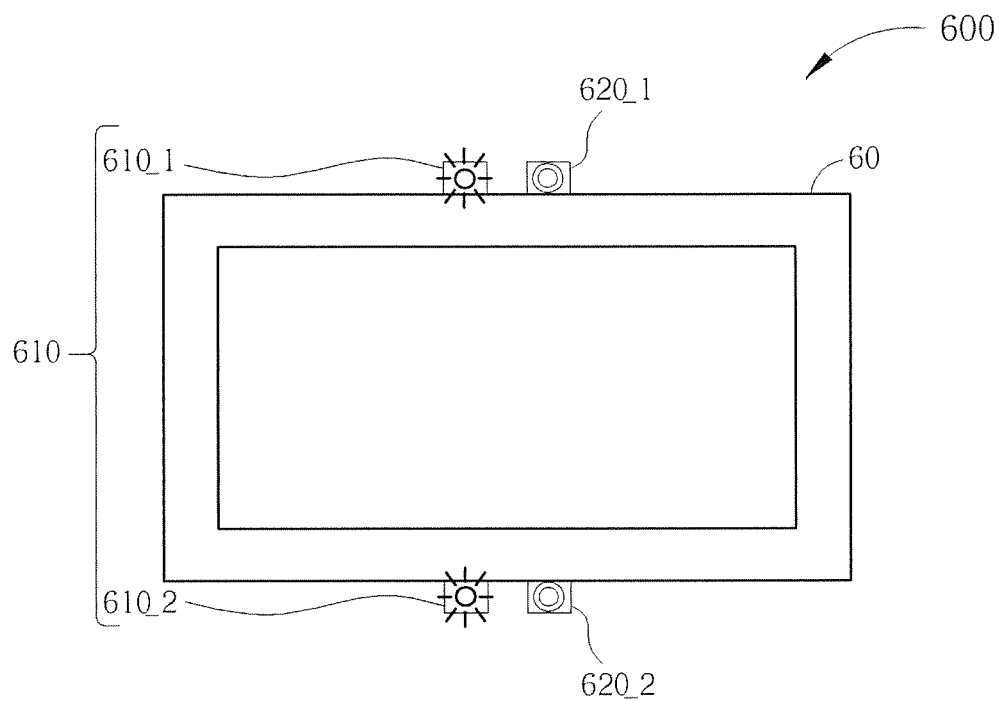
FIG. 6A-6B are diagram showing another position of the motion detecting systems according to embodiments of the present invention.
Figure 6B:
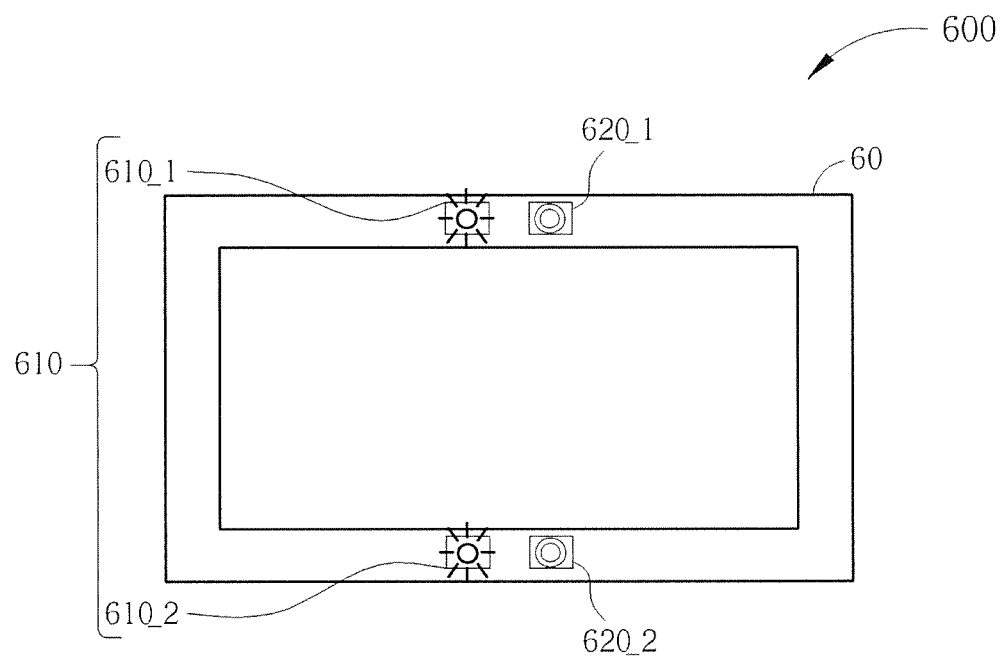

FIG. 6A and FIG. 6B are diagrams showing the positions of the motion detecting systems according to another embodiment of the present invention. As shown in FIG. 6A and FIG. 6B, the motion detecting system 600 comprises a light source module 610, image sensors 620_1-620_2 and a control unit (not shown). The light source module 610 comprises light emitting units 610_1 and 610_2. The light emitting unit 610_1 and the image sensor 620_1 are positioned on an up side of a display device 60, and the light emitting unit 610_2 and the image sensor 620_2 are positioned on a down side of the display device 60, therefore, the vertical sensing range of the motion detecting system 600 can be effectively increased. The difference between the embodiments shown in FIG. 6A and FIG. 6B is that: the light emitting units 610_1-610_2 and the image sensors 620_1-620_2 shown in FIG. 6B are positioned inside a housing of the display device 60, and the light emitting units 610_1-610_2 and the image sensors 620_1-620_2 shown in FIG. 6A are positioned outside the display device 60 (may be connected together or not).

Figure 7A:
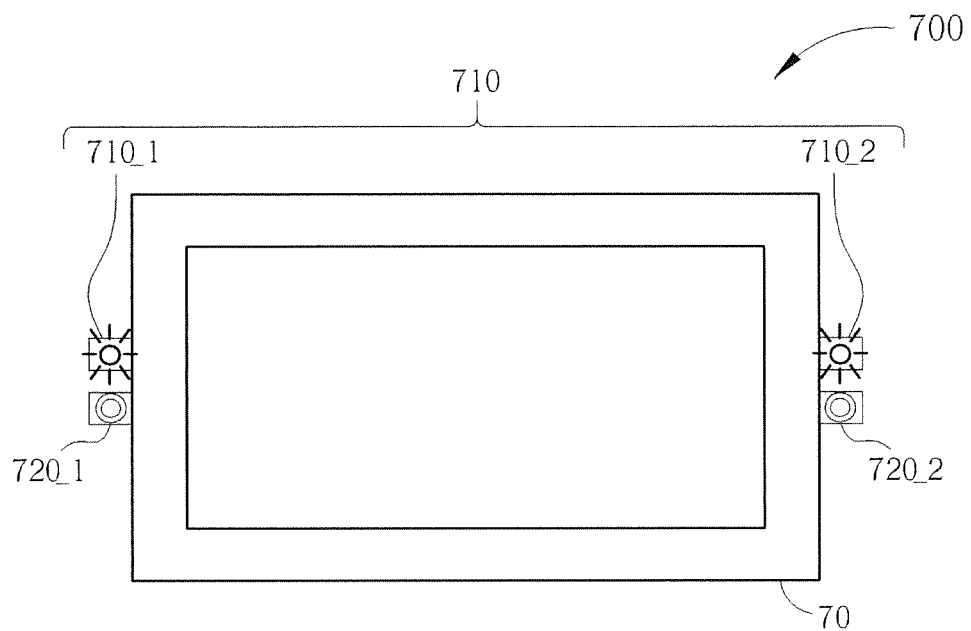
FIG. 7A-7B are diagrams showing another position of the motion detecting systems according to embodiments of the present invention.
Figure 7B:
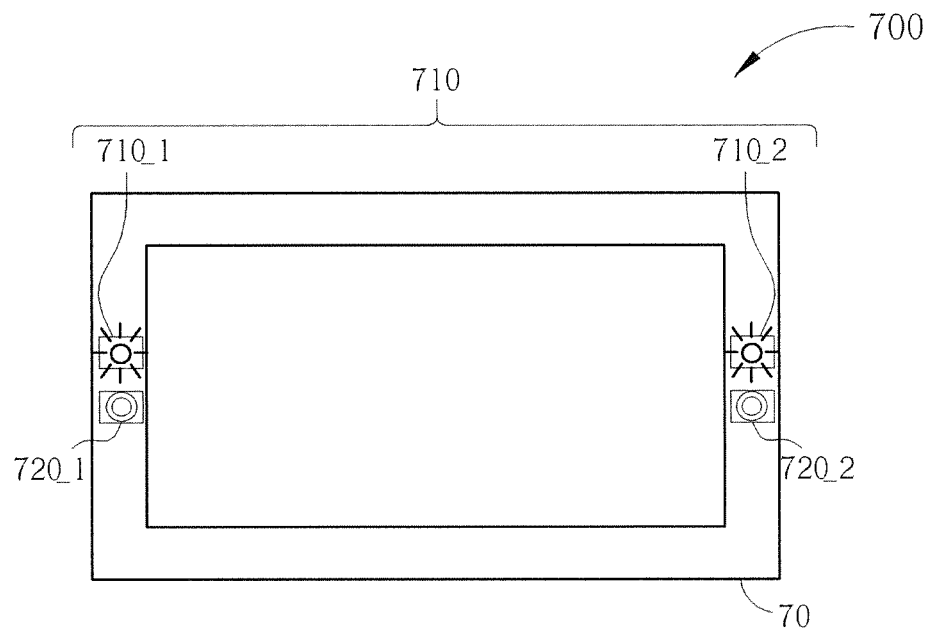

FIG. 7A and FIG. 7B are diagrams showing the positions of the motion detecting systems according to another embodiment of the present invention. As shown in FIG. 7A and FIG. 7B, the motion detecting system 700 comprises a light source module 710, image sensors 720_1-720_2 and a control unit (not shown). The light source module 710 comprises light emitting units 710_1 and 710_2. The light emitting unit 710_1 and the image sensor 720_1 are positioned on a left side of a display device 70, and the light emitting unit 710_2 and the image sensor 720_2 are positioned on a right side of the display device 70, therefore, the horizontal sensing range of the motion detecting system 700 can be effectively increased. Moreover, because the light emitting units 710_1 and 710_2 are positioned on different sides, the lighting range can be increased to improve the sensitivity of the motion detecting system 700. The difference between the embodiments shown in FIG. 7A and FIG. 7B is that: the light emitting units 710_1-710_2 and the image sensors 720_1-720_2 shown in FIG. 7B are positioned inside a housing of the display device 70, and the light emitting units 710_1-710_2 and the image sensors 720_1-720_2 shown in FIG. 7A are positioned outside the display device 70 (may be connected together or not).

Figure 8A:
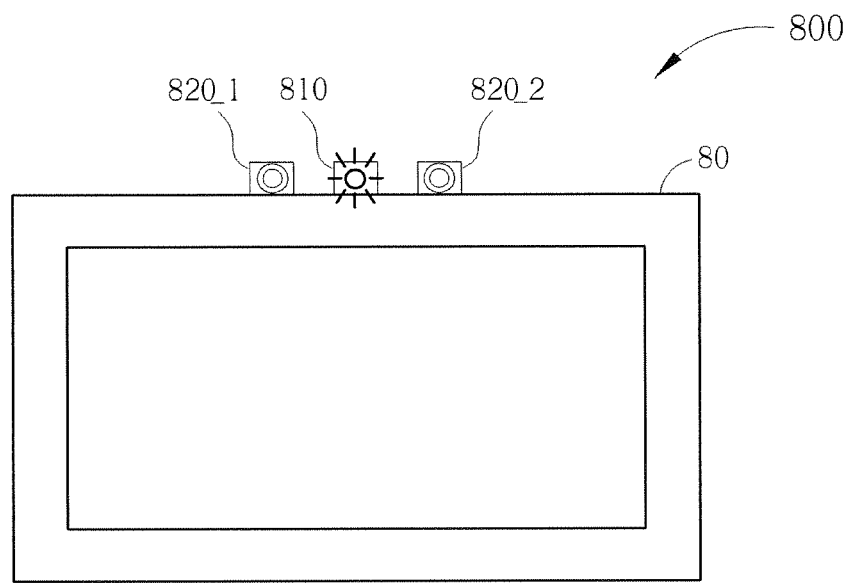
FIG. 8A-8B are diagrams showing another position of the motion detecting systems according to embodiments of the present invention.
Figure 8B:
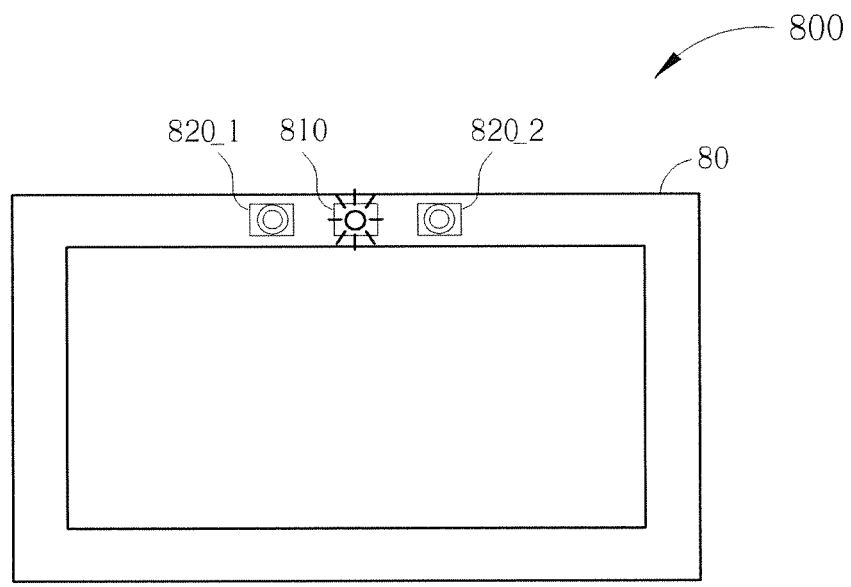

FIG. 8A and FIG. 8B are diagrams showing the positions of the motion detecting systems according to another embodiment of the present invention. As shown in FIG. 8A and FIG. 8B, the motion detecting system 800 comprises a light source module 810, image sensors 820_1-820_2 and a control unit (not shown). The light source module 810 and the image sensors 820_1-820_2 are positioned on the same side of a display device 80, and the image sensors 820_1-820_2 are positioned on two different sides of the light source module 810. Because the distance between the image sensors 820_1 and 820_2 is shorter, the image sensors 820_1 and 820_2 have an overlapping sensing range. If the image sensors 820_1 and 820_2 are simultaneously used to sense an object, three-dimension position information can be obtained. The difference between the embodiments shown in FIG. 8A and FIG. 8B is that: the light source module 810 and the image sensors 820_1-820_2 shown in FIG. 8B are positioned inside a housing of the display device 80, and the light source module 810 and the image sensors 820_1-820_2 shown in FIG. 8A are positioned outside the display device 80 (may be connected together or not).

Figure 9A:
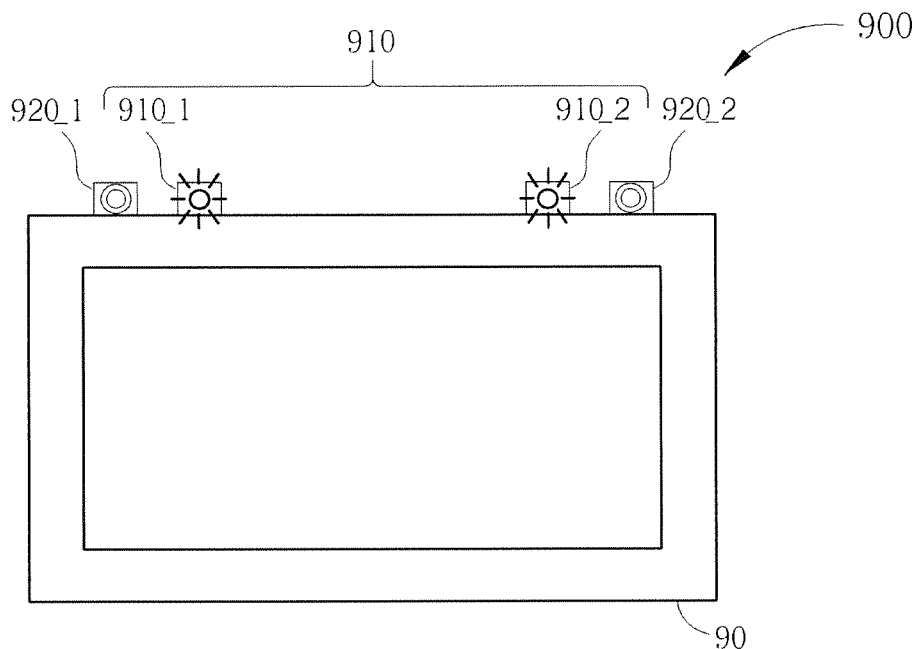
FIG. 9A-9B are diagrams showing another position of the motion detecting systems according to embodiments of the present invention.
Figure 9B:
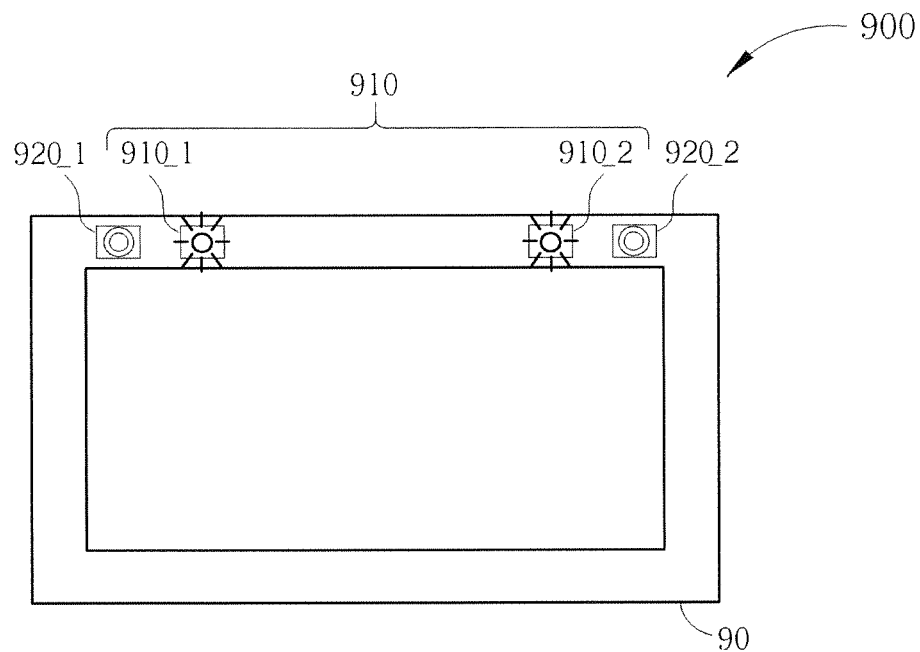

FIG. 9A and FIG. 9B are diagrams showing the positions of the motion detecting systems according to another embodiment of the present invention. As shown in FIG. 9A and FIG. 9B, the motion detecting system 900 comprises a light source module 910, image sensors 920_1-920_2 and a control unit (not shown). The light source module 910 comprises light emitting units 910_1-910_2. The light emitting units 910_1-910_2 and the image sensors 920_1-920_2 are positioned on the same side of a display device 90, the light source 910_1 and the image sensor 920_1 are positioned a relative left side of the display device 90, and the light source 910_2 and the image sensor 920_2 are positioned a relative right side of the display device 90. Because of the positions of the image sensors 920_1-920_2, three-dimension position information of an object may be obtained. In addition, because the motion detecting system 900 has more light emitting units, the sensitivity of the motion detecting system 900 is better. The difference between the embodiments shown in FIG. 9A and FIG. 9B is that: the light emitting units 910_1-910_2 and the image sensors 920_1-920_2 shown in FIG. 9B are positioned inside a housing of the display device 90, and the light emitting units 910_1-910_2 and the image sensors 920_1-920_2 shown in FIG. 9A are positioned outside the display device 90 (may be connected together or not).

Figure 10A:
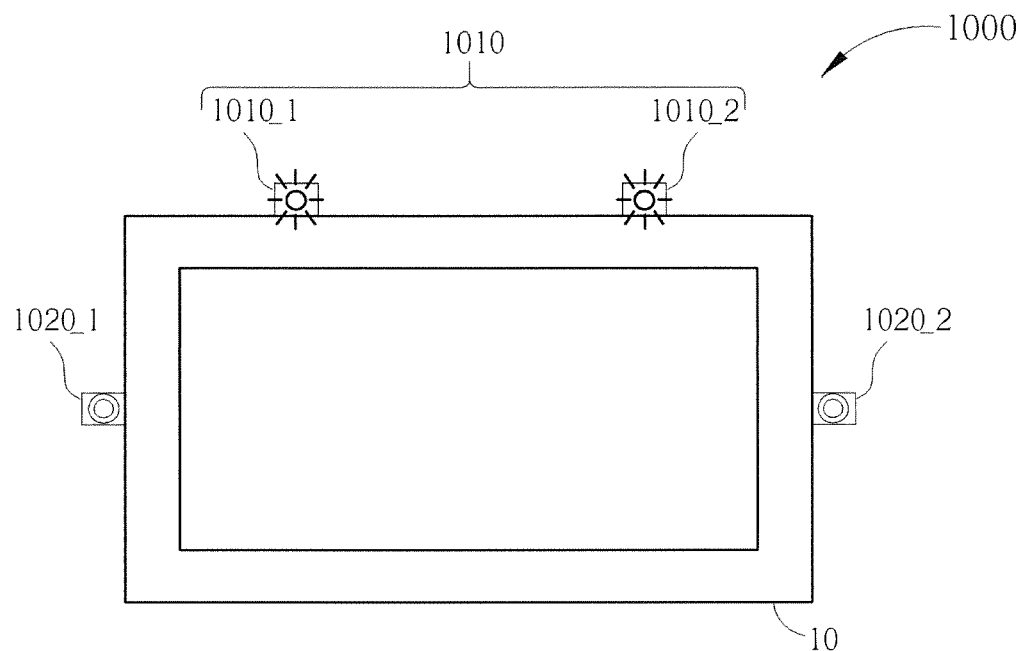
FIG. 10A-10B are diagrams showing another position of the motion detecting systems according to embodiments of the present invention.
Figure 10B:
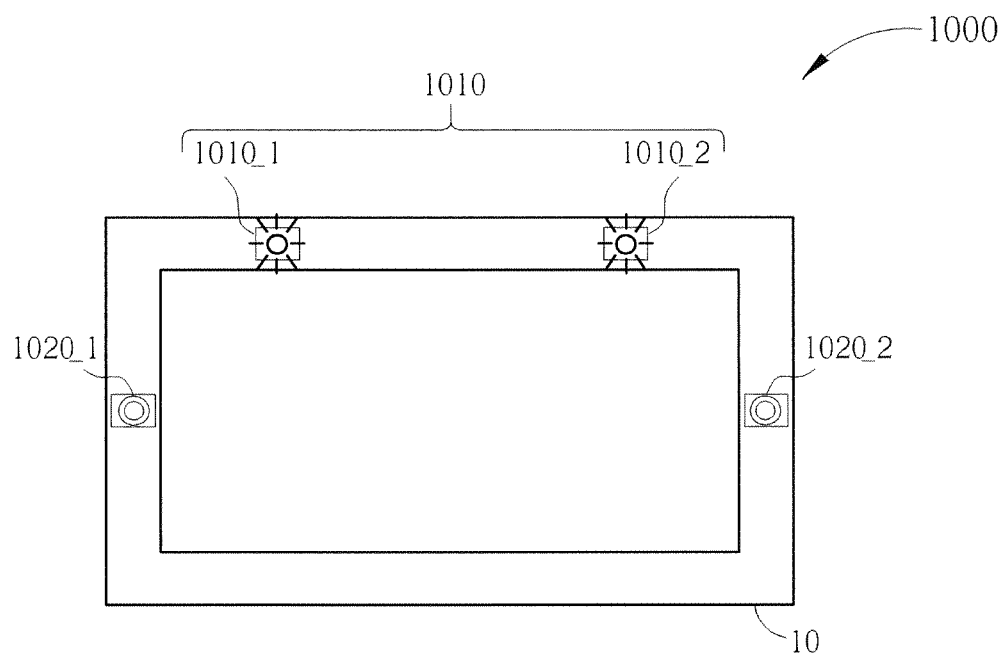

FIG. 10A and FIG. 10B are diagrams showing the positions of the motion detecting systems according to another embodiment of the present invention. As shown in FIG. 10A and FIG. 10B, the motion detecting system 1000 comprises a light source module 1010, image sensors 1020_1-1020_2 and a control unit (not shown). The light source module 1010 comprises light emitting units 1010_1-1010_2. The light emitting units 910_1-910_2 are positioned on the same side of a display device 10, and the image sensors 1020_1-1020_2 are positioned on the other two sides of the display device 10. The motion detecting system 1000 has a wider horizontal sensing range and a better sensitivity. The difference between the embodiments shown in FIG. 10A and FIG. 10B is that: the light emitting units 1010_1-1010_2 and the image sensors 1020_1-1020_2 shown in FIG. 10B are positioned inside a housing of the display device 10, and the light emitting units 1010_1-1010_2 and the image sensors 1020_1-1020_2 shown in FIG. 10A are positioned outside the display device 10 (may be connected together or not).

Figure 11A:
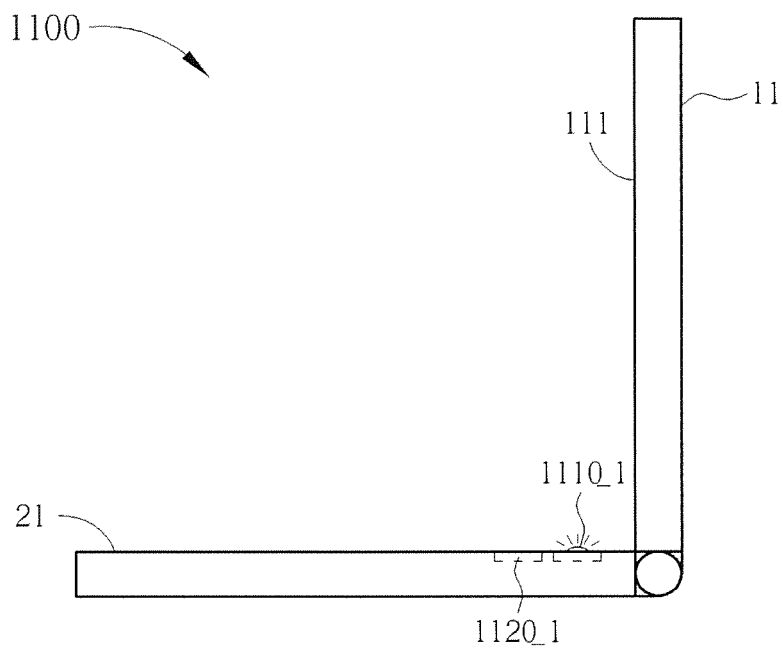
FIG. 11A-11D are diagrams showing another position of the motion detecting systems according to embodiments of the present invention.
Figure 11B:
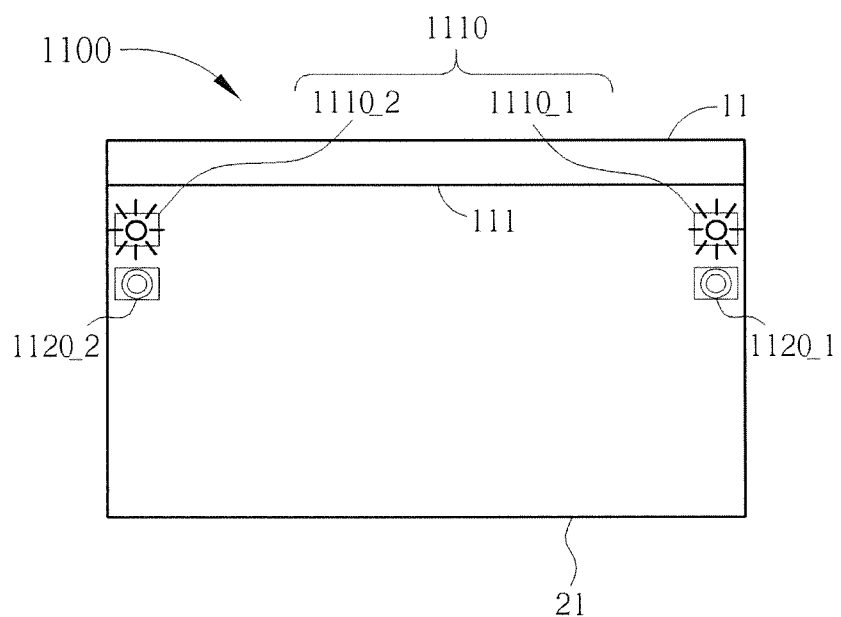
Figure 11C:
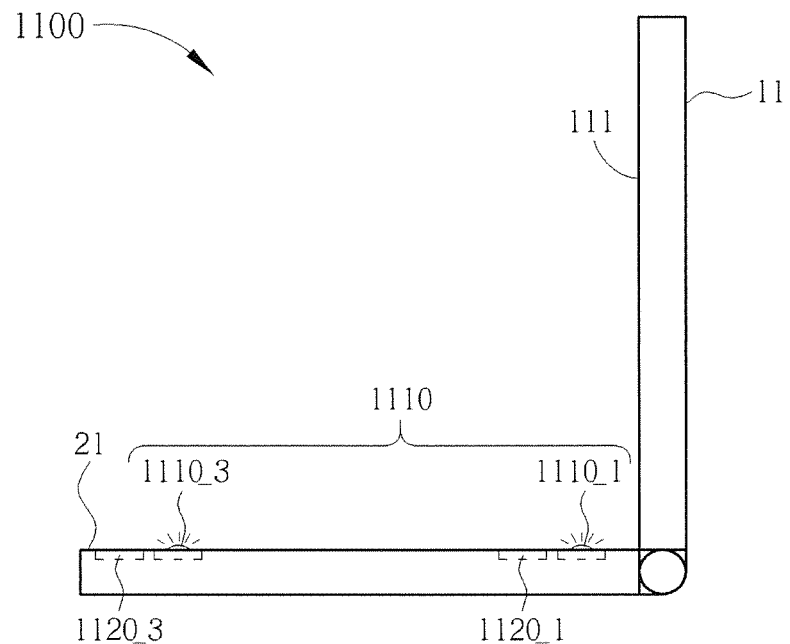
Figure 11D:
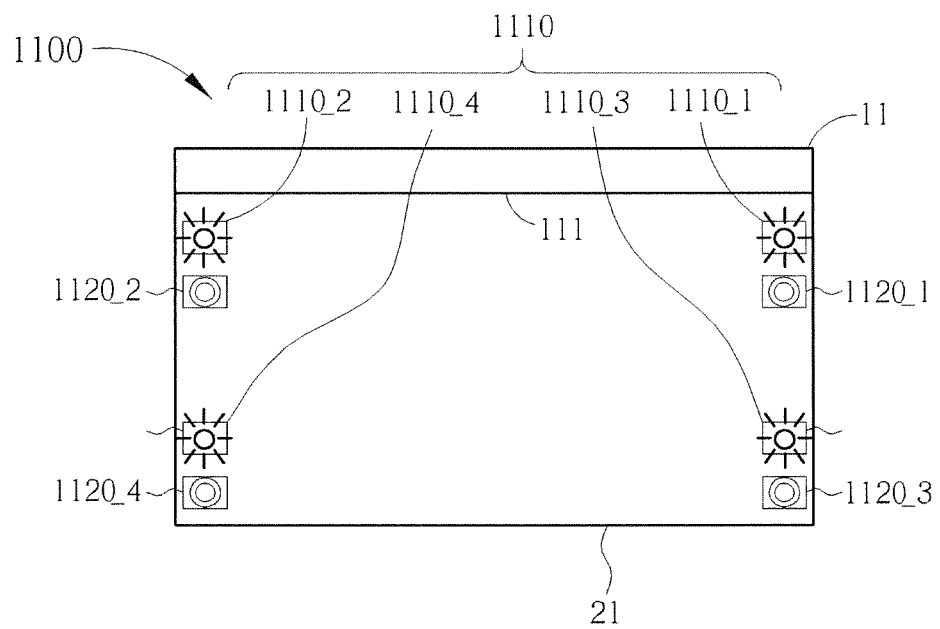

FIGS. 11A-11D are diagrams showing the positions of the motion detecting systems according to another embodiment of the present invention. Please refer to FIG. 11A and FIG. 11B first, where FIG. 11A is a side view of the embodiment, and FIG. 11B is a vertical view of the embodiment. The motion detecting system 1100 comprises a light source module 1110, image sensors 1120_1-1120_2 and a control unit (not shown). The light source module 1110 comprises light emitting units 1110_1-1110_2. The light emitting units 1110_1-1110_2 and the image sensors 1120_1-1120_2 are positioned on two sides of a front side of a display surface 111 of a display device 11. In this embodiment, because the light emitting units 1110_1-1110_2 and the image sensors 1120_1-1120_2 positioned in front of the display device 11, the sensed position information of the object is different from the previous embodiments. In addition, this embodiment also indicates that the motion detecting system of the present invention can be integrated into a notebook, where the display device 11 can be regarded as a built-in display of the notebook, and the bottom 21 can be regarded as a main body of the notebook. FIG. 11C and FIG. 11D are side view and vertical view of another embodiment. The difference between these two embodiments shown in FIG. 11A-11D is that: the embodiment shown in FIG. 11C and FIG. 11D has more image sensors 1120_3-1120_4 and more light emitting units 1110_3-1110_4, causing wider sensing range and better sensitivity.

Figure 12A:
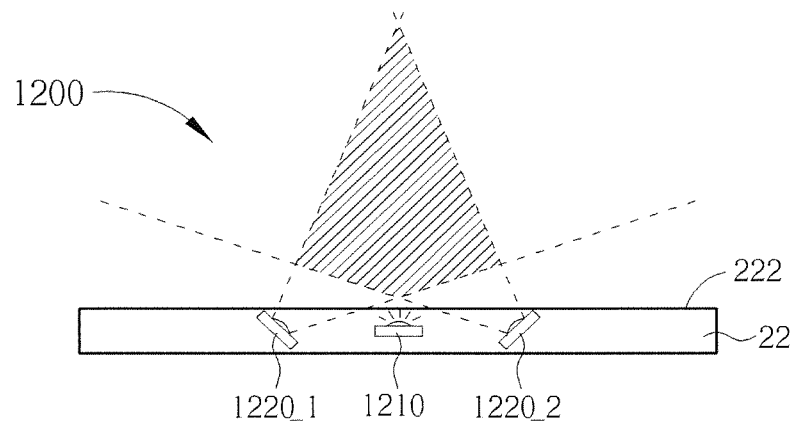
FIG. 12A-12B are diagrams showing another position of the motion detecting systems according to embodiments of the present invention.
Figure 12B:
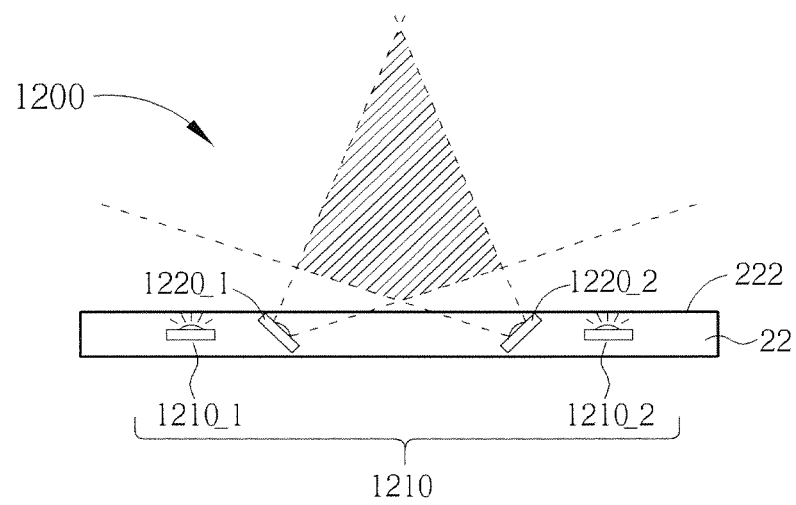

FIG. 12A and FIG. 12B are diagrams showing the positions of the motion detecting systems according to another embodiment of the present invention, where FIG. 12A and FIG. 12B is a vertical view of the motion detecting systems. The motion detecting system 1200 comprises a light source module 1210, image sensors 1220_1-1220_2 and a control unit (not shown). The image sensors 1220_1-1220_2 are positioned on a side of a display device 22 by using a non-parallel positioning method. That is, the positions of the image sensors 1220_1-1220_2 are not parallel to a display surface 222 of the display device 22. In this embodiment, because the image sensors 1220_1-1220_2 have a larger overlapping sensing range, more three-dimension information of an object can be obtained. The difference between these two embodiments shown in FIG. 12A and FIG. 12B is that: the embodiment shown in FIG. 12B has more light emitting units, and its sensitivity is better.

Figure 13A:
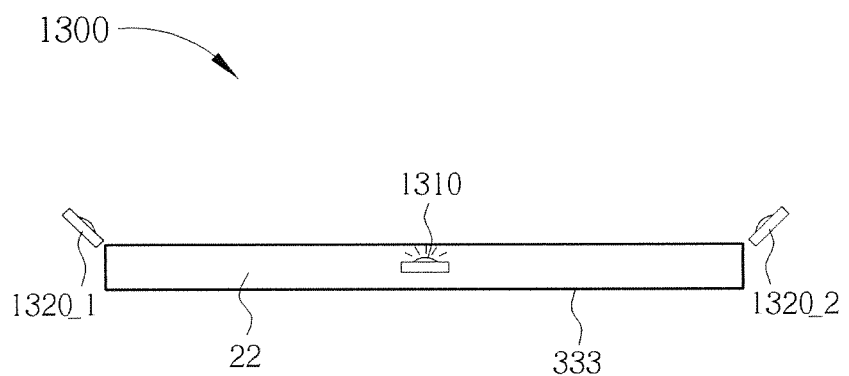
FIG. 13A-13B are diagrams showing another position of the motion detecting systems according to embodiments of the present invention.
Figure 13B:
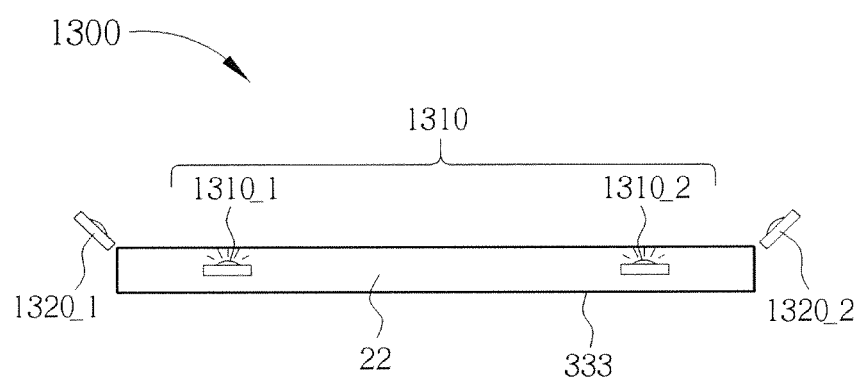

FIG. 13A and FIG. 13B are diagrams showing the positions of the motion detecting systems according to another embodiment of the present invention, where FIG. 13A and FIG. 13B is a vertical view of the motion detecting systems. The motion detecting system 1300 comprises a light source module 1310, image sensors 1320_1-1320_2 and a control unit (not shown). The image sensors 1320_1-1320_2 are positioned on a left side and a right side of a display device 33, respectively, by using a non-parallel positioning method (the image sensors 1320_1-1320_2 may be connected to an outside of the display device 33 or be built in a housing of the display device 33). That is, the positions of the image sensors 1320_1-1320_2 are not parallel to a display surface 333 of the display device 33. In this embodiment, because the image sensors 1320_1-1320_2 have a larger overlapping sensing range, more three-dimension information of an object can be obtained. The difference between these two embodiments shown in FIG. 13A and FIG. 13B is that: the embodiment shown in FIG. 13B has more light emitting units, and its sensitivity is better.

Referring to the above-mentioned embodiments, by using a non-parallel positioning method to arrange the positions of the image sensors on one side of the display device, the sensing ranges of the image sensors will have more overlapping region. However, in another embodiment, under this non-parallel positioning method, a position range of the image sensor can also be adjusted to make the sensing ranges of different image sensors are separate (i.e. not overlapped). Therefore, the image sensors may have an effective use, and the motion detecting system may have the largest sensing range. In addition, different image sensors may have different viewing angle and sensing range by using the lens design to satisfy the use's specific requirement about the sensing range. These alternative designs shall fall within the scope of the present invention.

Figure 14:
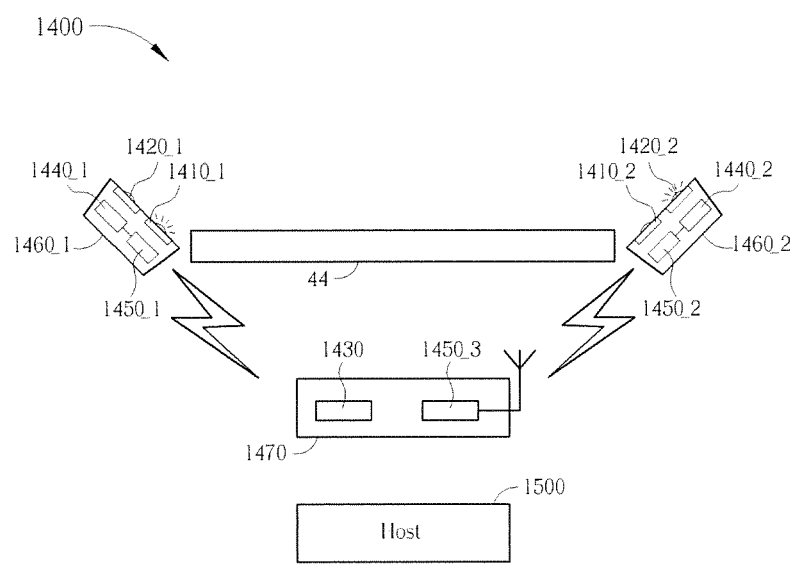
FIG. 14 is a diagram illustrating a motion detecting system having separate structure according to one embodiment of the present invention.

The motion detecting system of the present invention may also be implemented by using a separate structure. As shown in FIG. 14, the motion detecting system 1400 comprises motion detecting sub-systems 1460_1 and 1460_2, and a control sub-system 1470. The motion detecting sub-systems 1460_1 and 1460_2 comprise light emitting units 1410_1-1410_2, image sensors 1420_1-1420_2, computing units 1430_1-1430_2, wireless transmitting module 1450_1-1450_2, respectively, and the control sub-system 1470 comprises a control unit 1430 and a wireless transmitting module 1450_3. The motion detecting sub-systems 1460_1 and 1460_2 use their image sensors and computing units to generate determining results R_1 and R_2 by determining a shape and/or a center of the object, and/or by determining a relative distance, angle and moving direction between the object and the image sensors. Then, the determining results R_1 and R_2 are transmitted to the control sub-system 1470 via the wireless transmitting modules 1450_1-1450_2. The wireless transmitting module 1450_3 of the control sub-system 1470 transmits the received determining results R_1 and R_2 to the control unit 1430, and the control unit 1430 generates the control command S_command according to the determining results R_1 and R_2. Then, the control command S_command is transmitted to a host 1500 by using wire transmission or wireless transmission (via the wireless transmitting module 1450_3). In another embodiment of the present invention, the motion detecting sub-system 1460_1 may serve as a mater, and the motion detecting sub-system 1460_2 transmits its determining result R_2 to the motion detecting sub-system 1460_1 via the wireless transmitting module 1450_2. Then the computing unit 1440_1 generates an integrated determining result R_Final according to a sensing result of the image sensor 1420_1 and the determining result R_2, and the determining result R_2 is transmitted to the control sub-system 1470 via the wireless transmitting module 1450_1. The control unit 1430 generates the control command S_command according to the integrated determining result R_Final, and transmits the control command S_command to the host 1500 via wire transmission or wireless transmission. The host 1500 may start to execute an application according to the control command S_command, or the host 1500 may control the executed application according to the control command S_command, and the results of the application generated according to the control command S_command are shown on a display device 44. The above embodiment has the advantages such as the distance between different image sensors can be larger, not be limited by the length of the connecting lines, and wider sensing range.

Figure 15A:
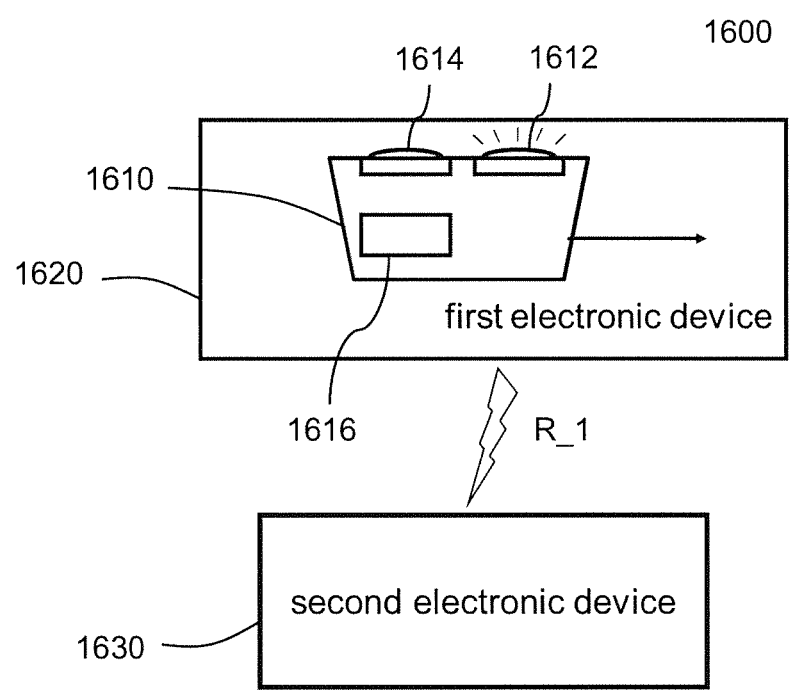
FIG. 15A-FIG. 15B are diagrams illustrating a motion detecting system according to an alternative embodiment of the present invention.

FIG. 15A is a diagram illustrating a motion detecting system according to an alternative embodiment of the present invention. Referring to FIG. 15A, the motion detecting system 1600 of this embodiment includes a first motion detecting sub-system 1610, a first electronic device 1620 and a second electronic device 1630. The first motion detecting sub-system 1610 is integrated in the first electronic device 1620. The first motion detecting sub-system 1610 includes a light emitting unit 1612, an image sensor 1614 and a computing unit 1616. The first motion detecting sub-system 1610 may generate a determining result R_1 that represents a relative distance, an angle or a moving direction between an object and the image sensor 1614 by using the image sensor 1614 and the computing unit 1616. For example, the first motion detecting sub-system 1610 may detect gesture motions of a user (e.g. leftward motion, rightward motion, forward motion, backward motion, upward motion, downward motion or specific gesture appearance) to accordingly generate a control command (e.g. the determining result R_1).

In this embodiment, the first electronic device 1620 may be a handheld electronic device or a portable electronic device, e.g. a cell phone, an electronic book, a tablet computer or other portable electronic devices without a display screen. More specifically, the determining result R_1 detected by the first motion detecting sub-system 1610 integrated on the first electronic device 1620 may be configured to control the operation mode (e.g. page flip, selection menu operation, software execution and so on) of the first electronic device 1620 as well as transmit the determining result R_1 to the second electronic device 1630 for controlling the second electronic device 1630, wherein the determining result R_1 may be transmitted to the second electronic device 1630 wirelessly. In another embodiment, the determining result R_1 may be transmitted to the second electronic device 1630 via a cable line. In this embodiment, the second electronic device 1630 may be a digital TV or other electronic devices with a display screen.

In one embodiment, the above determining result R_1 may be firstly processed by the first electronic device 1620 and then transmitted to the second electronic device 1630 so as to control or operate the state of the second electronic device 1630, e.g. switching on-screen webpages, switching TV channels, controlling volume of the second electronic device 1630. That is, the above determining result R_1 may be coordinate information of the object and the first electronic device 1620 may process the determining result R_1 so as to generate the control command for controlling the second electronic device 1630.

Figure 15B:
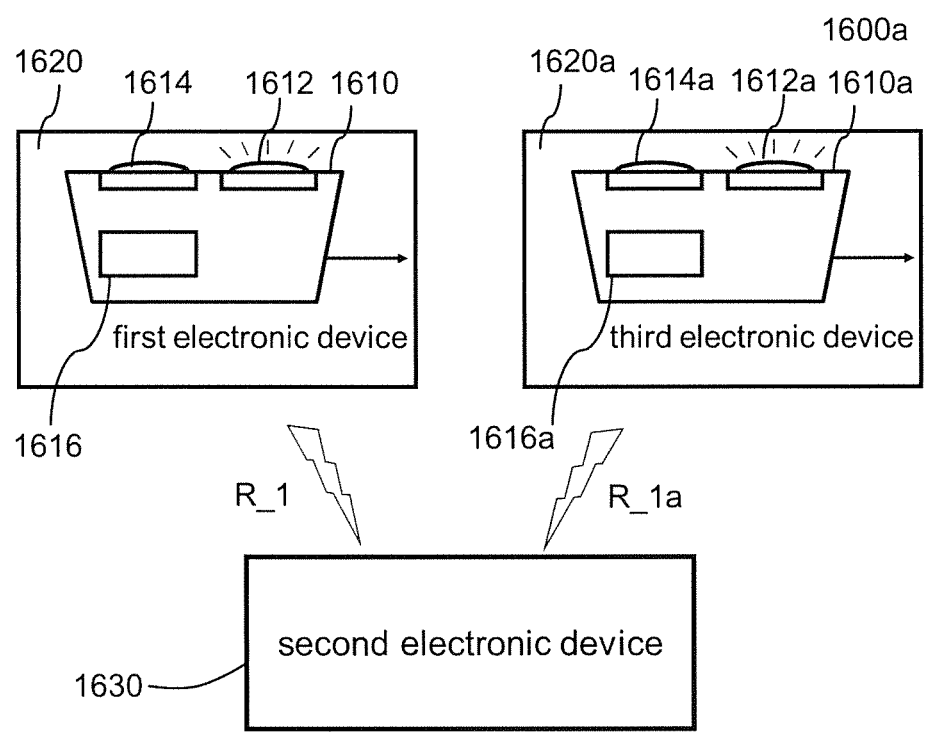

FIG. 15B is a diagram illustrating a motion detecting system according to an alternative embodiment of the present invention. Referring to FIGS. 15A and 15B, the motion detecting system 1600a of this embodiment has the same concept as the above motion detecting system 1600, and the difference therebetween is that the motion detecting system 1600a further includes at least one second motion detecting sub-system 1610a and at least one third electronic device 1620a employing the second motion detecting sub-system 1610a, wherein the second motion detecting sub-system 1610a integrated in the third electronic device 1620a includes a light emitting unit 1612a, an image sensor 1614a and a computing unit 1616a. Similarly, the second motion detecting sub-system 1610a may generate a determining result R_1a that represents a relative distance, an angle or a moving direction between an object and the image sensor 1614a by using the image sensor 1614a and the computing unit 1616a. For example, the second motion detecting sub-system 1610a may detect gesture motions of a user (e.g. leftward motion, rightward motion, forward motion, backward motion, upward motion, downward motion or specific gesture appearance) to accordingly generate a control command (e.g. the determining result R_1a).

More specifically, the motion detecting system 1600a may perform the detection or identification of the gesture or object by using the first electronic device 1620 integrated with the first motion detecting sub-system 1610 as well as perform the detection or identification of the gesture or object by using the third electronic device 1620a integrated with the second motion detecting sub-system 1610a; that is, the motion detecting system 1600a of this embodiment may be operated simultaneously by different users holding the first electronic device 1620 and the third electronic device 1620a respectively so as to be applied to multi-user control operation, e.g. used in games.

It is noted that the term "one embodiment" mentioned above represents a particular feature, structure, or characteristic described for the embodiment are included in at least one implementation of the present invention. Furthermore, the term "one embodiment" appears in different paragraphs represents a different embodiment. Therefore, although different structural features or methods are described for the different embodiments described above, but it should be noted that these different characteristics may be implemented on the same specific embodiment through appropriate modifications.

Briefly summarized, the motion detecting system of the present invention may increase the effective sensing range and sensitivity by using more image sensors and lighting units, and therefore the efficiency of the motion detecting system is enhanced. In addition, by using the above-mentioned positioning method of the embodiments, each of the image sensors may have its most effective use.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A motion detecting system, comprising:
   a first motion detecting sub-system comprising a light emitting unit, an image sensor and a computing unit, wherein
   the first motion detecting sub-system is configured to generate a determining result that represents a relative distance between an object and the image sensor by analyzing, using the computing unit, image contents of image sensing results generated by the image sensor,
   the light emitting unit is configured to illuminate the object, and
   the image sensor is configured to receive reflecting light from the object formed by reflecting light emitted from the light emitting unit;
   a second motion detecting sub-system which has a same type as the first motion detecting sub-system, the second motion detecting sub-system comprising a further light emitting unit, and configured to generate a further determining result that represents at least one of a relative distance, an angle and a moving direction of the second motion detecting sub-system with respect to the object;
   a first electronic device configured to receive the determining result and the further determining result respectively from the first and second motion detecting sub-systems and transmit the determining result and the further determining result, wherein the light emitting unit, the image sensor and the computing unit of the first motion detecting sub-system as well as the second motion detection sub-system are integrated in the first electronic device; and
   a second electronic device configured to wirelessly receive the determining result and the further determining result from the first electronic device for controlling or operating a state of the second electronic device,
   wherein the second electronic device comprises a display screen having a display surface, and
   a sensing range of the image sensor does not cover the display surface of the second electronic device.

2. The motion detecting system of claim 1, wherein the first motion detecting sub-system is configured to detect gesture motions of a user as the determining result.

3. The motion detecting system of claim 1, wherein the first electronic device is free of a display screen.

4. The motion detecting system of claim 1, wherein the determining result generated by the first motion detecting sub-system is configured to control an operation mode of the first electronic device.

5. The motion detecting system of claim 1, wherein the second electronic device is a digital television.

6. The motion detecting system of claim 1, wherein the second motion detecting sub-system and the first motion detecting sub-system are arranged on different positions in the first electronic device.

7. The motion detecting system of claim 6, wherein the first motion detecting sub-system and the second motion detecting sub-system are configured to simultaneously detect the object.

8. A motion detecting system, comprising:
a first motion detecting sub-system comprising a light emitting unit, an image sensor and a computing unit, wherein
the first motion detecting sub-system is configured to generate a determining result that represents a relative distance between an object and the image sensor by analyzing, using the computing unit, image contents of image sensing results generated by the image sensor,
the light emitting unit is configured to illuminate the object, and
the image sensor is configured to receive reflecting light from the object formed by reflecting light emitted from the light emitting unit;
a first electronic device configured to receive the determining result from the first motion detecting sub-system and transmit the determining result, wherein the light emitting unit, the image sensor and the computing unit of the first motion detecting sub-system are integrated in the first electronic device;
a second electronic device; and
a third electronic device, separated from the first electronic device, integrated with a second motion detecting sub-system, the second motion detecting sub-system having a same type as the first motion detecting sub-system and comprising a further light emitting unit, a further image sensor and a further computing unit, the third electronic device configured to generate a further determining result that represents at least one of a relative distance, an angle and a moving direction of the further image sensor with respect to the object, wherein
the second electronic device is separated from the first and third electronic devices, and configured to wirelessly receive the determining result and the further determining result from the first and third electronic devices for controlling or operating a state of the second electronic device,
the second electronic device comprises a display screen having a display surface, and
a sensing range of the image sensor does not cover the display surface of the second electronic device.

9. A motion detecting system, comprising:
a first motion detecting sub-system comprising a light emitting unit, an image sensor and a computing unit, wherein
the first motion detecting sub-system is configured to generate a determining result that represents a relative distance between an object and the image sensor by analyzing, using the computing unit, image contents of image sensing results generated by the image sensor,
the light emitting unit is configured to illuminate the object, and
the image sensor is configured to receive reflecting light from the object formed by reflecting light emitted from the light emitting unit;
a second motion detecting sub-system, which has a same type as the first motion detecting sub-system, and is configured to generate a further determining result that represents at least one of a relative distance, an angle and a moving direction of the second motion detecting sub-system with respect to the object;
a first electronic device configured to receive an integrated determining result associated with the determining result and the further determining result from the first motion detecting sub-systems and transmit the integrated determining result, wherein
the light emitting unit, the image sensor and the computing unit of the first motion detecting sub-system as well as the second motion detection sub-system are integrated in the first electronic device,
the second motion detecting sub-system is configured to send the further determining result to the first motion detecting sub-system, and
the first motion detecting sub-system is configured to form the integrated determining result from (i) the determining result and (ii) the further determining result received from the second motion detecting sub-system; and
a second electronic device configured to receive the integrated determining result wirelessly from the first electronic device for controlling or operating a state of the second electronic device,
wherein the second electronic device comprises a display screen having a display surface, and
a sensing range of the image sensor does not cover the display surface of the second electronic device.

10. The motion detecting system of claim 1, wherein the light emitting unit of the first motion detecting sub-system and the further light emitting unit of the second motion detecting sub-system have a same type.

11. The motion detecting system of claim 1, wherein the first motion detecting sub-system and the second motion detecting sub-system are gesture sensors.

12. The motion detecting system of claim 1, wherein the light emitting unit and the further light emitting unit are arranged at identical positions respectively on the first motion detecting sub-system and the second motion detecting sub-system.

* * * * *